No. 853,512. PATENTED MAY 14, 1907.
F. R. HENDERSHOT.
ATTACHMENT FOR DUMP CARTS.
APPLICATION FILED APR. 14, 1906.
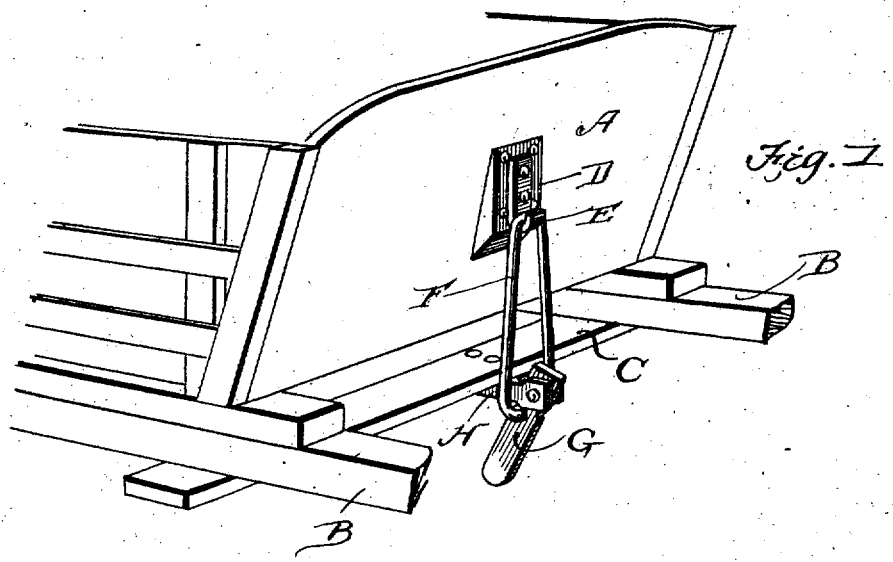
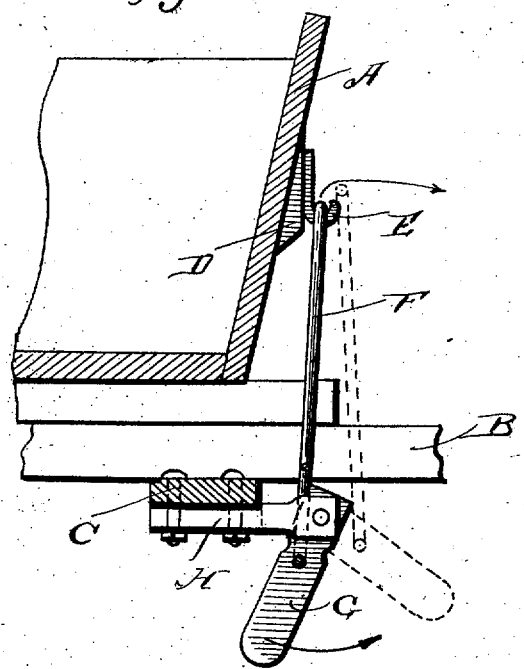
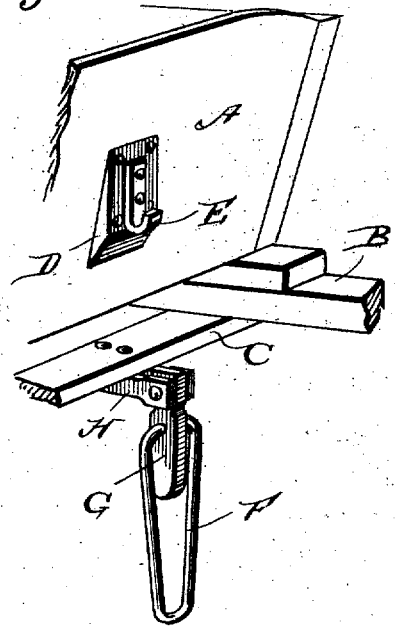
WITNESSES:
INVENTOR
F. R. Hendershot.
BY
Attorneys

UNITED STATES PATENT OFFICE.

FULLER R. HENDERSHOT, OF PLYMOUTH, PENNSYLVANIA.

ATTACHMENT FOR DUMP-CARTS.

No. 853,512.
Specification of Letters Patent.
Patented May 14, 1907.

Application filed April 14, 1906. Serial No. 311,712.

*To all whom it may concern:*

Be it known that I, FULLER R. HENDERSHOT, a citizen of the United States, residing at Plymouth, in the county of Luzerne and State of Pennsylvania, have invented a new and useful Improvement in Attachments for Dump-Carts, of which the following is a specification.

This invention relates generally to dump carts and more particularly to an improved means for fastening said carts, the object being to provide an exceedingly cheap and simple appliance by means of which the cart can be quickly and easily fastened or unfastened, as desired, and with this object in view the invention consists essentially in the employment of a hook adapted to be attached to the front end of the cart, a bail adapted to engage said hook, said bail being pivotally connected to a lever, said lever being so pivoted with reference to the hook and bail that if thrown back or locked, the bail is brought tightly into engagement with the hook and all danger of the parts becoming disengaged avoided.

The invention consists also in certain details of construction hereinafter fully described and pointed out in the claims.

In the drawings—Figure 1 is a perspective view showing the practical application of my invention; Fig. 2 is a sectional elevation of the same; Fig. 3 is a detail perspective view showing the parts unlocked and the cart ready to be dumped.

Referring to the drawings, A indicates the body of the cart, B the thills or shafts and C cross beam connecting the thills or shafts and arranged upon the underside of the same, all of said parts being of the usual or any approved construction. A block D is attached to the front end of the wagon body, said block being wedge-shaped in order to present a vertical front face, and connected to this block is a hook E which hook is adapted to be engaged by a stout metal bail F, the opposite end of the bail being pivotally connected to a lever G which is pivotally mounted between the parallel ears H, said ears being rigidly connected to the underside of the cross beam C. The bail F, as before stated, is adapted to engage the hook E at one end and when the lever G is thrown back, the bail is drawn down so as to bind all of the parts close together, and it will be noted that the bail F is sufficiently broad at its lower end to conveniently straddle the forwardly projecting ears H so that the lever G can be quickly and easily swung back and forth for the purpose of locking and unlocking the cart.

It will be seen by reference to Fig. 2 that the pivotal points of the lever and bail are so arranged with reference to each other that when the lever is swung forwardly the bail is raised so that it can be quickly and easily thrown over the hook and when it is desired to lock the parts it is only necessary to throw the upper end of the bail over the hook and then force the lever G rearwardly, as shown in full lines in Fig. 2, and the bail is then drawn down a sufficient distance to bind tightly upon the hook and securely lock all of the parts in their proper positions.

What I claim is—

1. The combination with the cart thills and cross beam, of a hook arranged at the end of the cart, a bail adapted to engage said hook, a lever to which the bail is attached, and means for pivotally supporting said lever, as set forth.

2. The combination with a cart having a block arranged upon the front end thereof, of a hook attached to the block, a bail adapted to engage the hook, a lever to which the lower end of the bail is pivoted, a cross-beam, a pair of ears connected to said cross beam and the lever pivoted between the ears, all arranged and adapted to operate, substantially as described.

FULLER R. HENDERSHOT.

Witnesses:
GEO. W. WILLIAMS,
JOHN L. JONES.